US012665346B2

(12) United States Patent
Wu et al.

(10) Patent No.: US 12,665,346 B2
(45) Date of Patent: Jun. 23, 2026

(54) WATER RESISTANT ELECTRICAL CONNECTOR

(71) Applicant: Amphenol East Asia Electronic Technology (Shenzhen) Co., Ltd., Shenzhen (CN)

(72) Inventors: Fei Wu, Shenzhen (CN); Zhimin Qin, Shenzhen (CN)

(73) Assignee: Amphenol East Asia Electronic Technology (Shenzhen) Co., Ltd., Shenzhen (CN)

( * ) Notice: Subject to any disclaimer, the term of this patent is extended or adjusted under 35 U.S.C. 154(b) by 321 days.

(21) Appl. No.: 18/380,958

(22) Filed: Oct. 17, 2023

(65) Prior Publication Data

US 2024/0128678 A1 Apr. 18, 2024

(30) Foreign Application Priority Data

Oct. 18, 2022 (CN) ........................ 202222749419.X

(51) Int. Cl.
*H01R 43/00* (2006.01)
*H01R 13/52* (2006.01)

(52) U.S. Cl.
CPC ....... *H01R 13/5202* (2013.01); *H01R 43/005* (2013.01)

(58) Field of Classification Search
None
See application file for complete search history.

(56) References Cited

U.S. PATENT DOCUMENTS 9,484,679 B2 11/2016 Guo et al.
9,509,084 B2 11/2016 Zhao et al.
(Continued)

FOREIGN PATENT DOCUMENTS

CN 101019277 A 8/2007
CN 102047507 A 5/2011
(Continued)

OTHER PUBLICATIONS

[No Author Listed], Universal Serial Bus Type-C Connectors and Cable Assemblies Compliance Document. Revision 2.1b. Jun. 2021. 86 pages.

(Continued)

*Primary Examiner* — Tho D Ta
(74) *Attorney, Agent, or Firm* — Wolf, Greenfield & Sacks, P.C.

(57) ABSTRACT

Electrical connectors with improved water resistance. A connector may have an outer shell and an inner shell disposed in the outer shell. The inner shell may extend beyond the outer shell in a mating direction. A portion of the inner shell that extends beyond the outer shell in the mating direction may have a surface roughness higher than portions of the inner shell such that a seal can be securely attached to the rough portion of the inner shell. The seal can be made of an adhesive shaped and cured when disposed on the rough portion. The seal can be spaced from the outer shell such that the seal can abut a mating component when the connector is pressed, in the mating direction, against the mating component, blocking ingress of environmental contaminants. The seal may also block any path between the mating ends of the inner and outer shells.

20 Claims, 8 Drawing Sheets

(56) References Cited

U.S. PATENT DOCUMENTS

| | | | | |
|---|---|---|---|---|
| 9,553,410 | B2 | 1/2017 | Zhao et al. | |
| 9,685,728 | B2 | 6/2017 | Yao et al. | |
| 9,711,910 | B2 | 7/2017 | Zhao et al. | |
| 9,742,098 | B2 * | 8/2017 | Zhao | H01R 13/5202 |
| 9,755,348 | B2 | 9/2017 | Guo et al. | |
| 9,768,544 | B2 | 9/2017 | Du et al. | |
| 9,774,130 | B2 | 9/2017 | Zhao et al. | |
| 9,806,475 | B2 | 10/2017 | Yao et al. | |
| 9,853,393 | B2 | 12/2017 | Guo et al. | |
| 9,871,317 | B2 | 1/2018 | Zhang et al. | |
| 9,871,318 | B2 | 1/2018 | Wang | |
| 9,893,459 | B2 | 2/2018 | Zhao et al. | |
| 9,954,303 | B2 | 4/2018 | Guo et al. | |
| 9,997,859 | B2 | 6/2018 | Yu | |
| 9,997,865 | B2 | 6/2018 | Yao | |
| 9,997,866 | B1 | 6/2018 | Hsu | |
| 10,044,148 | B2 | 8/2018 | Zhao | |
| 10,050,373 | B2 | 8/2018 | Wang | |
| 10,062,999 | B2 | 8/2018 | Yao et al. | |
| 10,096,932 | B2 | 10/2018 | Chang et al. | |
| 10,096,947 | B2 | 10/2018 | Cheng et al. | |
| 10,109,948 | B2 | 10/2018 | Zhao et al. | |
| 10,177,488 | B2 | 1/2019 | Zhao | |
| 10,193,271 | B2 | 1/2019 | Yu et al. | |
| 10,199,763 | B2 | 2/2019 | Zhu et al. | |
| 10,199,764 | B2 | 2/2019 | Wang | |
| 10,312,628 | B2 * | 6/2019 | Zhang | H01R 13/6595 |
| 10,468,809 | B2 * | 11/2019 | Zhao | H01R 13/6593 |
| 10,903,610 | B1 | 1/2021 | He et al. | |
| 10,910,747 | B1 | 2/2021 | He et al. | |
| 11,165,191 | B2 * | 11/2021 | Choi | H01R 24/60 |
| 11,336,057 | B2 * | 5/2022 | Kawasaki | H01R 13/6585 |
| 11,621,513 | B2 | 4/2023 | He et al. | |
| 11,764,534 | B2 | 9/2023 | Li | |
| 2010/0330849 | A1 | 12/2010 | Wang et al. | |
| 2011/0151716 | A1 | 6/2011 | Kondo | |
| 2012/0040562 | A1 | 2/2012 | Zhu et al. | |
| 2013/0178115 | A1 | 7/2013 | Ao et al. | |
| 2015/0229075 | A1 | 8/2015 | Lin et al. | |
| 2016/0064879 | A1 | 3/2016 | Yen et al. | |
| 2017/0207570 | A1 | 7/2017 | Guo et al. | |
| 2017/0288333 | A1 | 10/2017 | Yao et al. | |
| 2017/0288360 | A1 | 10/2017 | Zhao et al. | |
| 2017/0302031 | A1 | 10/2017 | Cheng et al. | |
| 2017/0302037 | A1 | 10/2017 | Yao et al. | |
| 2017/0324187 | A1 | 11/2017 | Zhu et al. | |
| 2017/0338584 | A1 | 11/2017 | Yao | |
| 2017/0338585 | A1 | 11/2017 | Wang | |
| 2017/0338586 | A1 | 11/2017 | Wang | |
| 2017/0365961 | A1 | 12/2017 | Zhao | |
| 2018/0019534 | A1 | 1/2018 | Yu | |
| 2018/0034195 | A1 | 2/2018 | Chang et al. | |
| 2018/0151983 | A1 | 5/2018 | Zhao | |
| 2018/0151987 | A1 | 5/2018 | Zhao | |
| 2018/0151988 | A1 | 5/2018 | Zhao | |
| 2018/0159267 | A1 | 6/2018 | Zhao | |
| 2018/0175562 | A1 | 6/2018 | Zhao | |
| 2018/0323548 | A1 | 11/2018 | Zhao | |
| 2018/0337489 | A1 | 11/2018 | Zhao | |
| 2018/0342839 | A1 | 11/2018 | Zhao et al. | |
| 2018/0351287 | A1 | 12/2018 | Zhao | |
| 2018/0358756 | A1 | 12/2018 | Zhao | |
| 2018/0375263 | A1 | 12/2018 | Zhong et al. | |
| 2022/0360035 | A1 | 11/2022 | Li | |
| 2022/0393384 | A1 | 12/2022 | He et al. | |

FOREIGN PATENT DOCUMENTS

| | | | | | |
|---|---|---|---|---|---|
| CN | 202737214 | U | | 2/2013 | |
| CN | 204243365 | U | | 4/2015 | |
| CN | 204927638 | U | | 12/2015 | |
| CN | 205509128 | U | | 8/2016 | |
| CN | 206727300 | U | | 12/2017 | |
| CN | 108155511 | B | | 2/2020 | |
| CN | 113871950 | A | * | 12/2021 | H01R 43/20 |
| CN | 114824908 | A | * | 7/2022 | H01R 12/55 |
| JP | 3196314 | U | | 3/2015 | |
| TW | M493185 | U | | 1/2015 | |
| WO | WO 2009/147791 | A1 | | 12/2009 | |

OTHER PUBLICATIONS

Liu et al., Compact Water Resistance Electrical Connector, U.S. Appl. No. 18/467,971, filed Sep. 15, 2023.

[No Author Listed], USB Type-C Cable and Connector Specification. Release 2.0. Aug. 2019. p. 42-55.

* cited by examiner

WATER RESISTANT ELECTRICAL CONNECTOR

RELATED APPLICATION

This application claims priority to and the benefit of Chinese Patent Application Serial No. 202222749419.X, filed on Oct. 18, 2022, entitled "ELECTRICAL CONNECTOR," which is herein incorporated by reference in its entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known arrangement for joining several electronic subassemblies is to have one printed circuit board serve as a backplane. A known backplane is a PCB onto which many connectors may be mounted. Conducting traces in the backplane may be electrically connected to signal conductors in the connectors so that signals may be routed between the connectors. Other printed circuit boards, called "daughterboards," "daughtercards," or "midboards," may be connected through the backplane. For example, daughtercards may also have connectors mounted thereon. The connectors mounted on a daughtercard may be plugged into the connectors mounted on the backplane. In this way, signals may be routed among daughtercards through the connectors and the backplane. The daughtercards may plug into the backplane at a right angle. The connectors used for these applications may therefore include a right angle bend and are often called "right angle connectors."

Connectors may also be used in other configurations for interconnecting electronic assemblies. Sometimes, one or more printed circuit boards may be connected to another printed circuit board, called a "motherboard," that is both populated with electronic components and interconnects the daughterboards. In such a configuration, the printed circuit boards connected to the motherboard may be called daughterboards. The daughterboards are often smaller than the motherboard and may sometimes be aligned parallel to the motherboard. Connectors used for this configuration are often called "stacking connectors" or "mezzanine connectors." In other systems, the daughterboards may be perpendicular to the motherboard.

Connectors may also be used in computers in which the motherboard might have a processor and a bus configured to pass data between the processor and peripherals, such as a printer or memory device. Connectors may be mounted to the motherboard and connected to the bus. A mating interface of those connectors may be exposed through an opening in the enclosure for the computer, such that connectors, often attached to the peripheral through a cable, may be inserted into the connectors on the motherboard. With this configuration, a peripheral can be easily connected to a computer.

To enhance the availability of peripherals, the bus and the connectors used to physically connect peripherals via the bus may be standardized. In this way, there may be a large number of peripherals available from a multitude of manufacturers. All of those products, so long as they are compliant with the standard, may be used in a computer that has a bus compliant with the standard. Examples of such standards include universal serial bus (USB), which is commonly used in computers. The standards have gone through multiple revisions, adapting to the higher performance expected from computers over time.

Some USB connectors are water resistant. These connectors may include seals that block water from outside the computer enclosure from entering the computer enclosure through the opening left for the connector.

BRIEF SUMMARY

Aspects of the present application relate to water resistant electrical connectors.

Some embodiment relates to an electrical connector. The electrical connector may include a lead assembly; an inner shell disposed outside the lead assembly and including a mating end, the mating end including a portion that has a surface roughness higher than that of portions of the inner shell; an outer shell disposed outside the inner shell and including a mating end offset from the mating end of the inner shell in a mating direction; and a seal attached to the portion of the mating end of the inner shell.

Optionally, the surface roughness of the portion of the inner shell is obtained with Electrical Discharge Machining (EDM) in a range of 8 to 12.

Optionally, the portion of the mating end of the inner shell includes a pattern.

Optionally, the pattern includes stripes in opposite directions.

Optionally, the pattern includes at least one of star-shaped symbol, H-shaped symbol, or X-shaped symbol.

Optionally, the portion of the mating end of the inner shell extends from a mating edge of the inner shell in the mating direction by a distance in a range of 0.5 mm to 1.5 mm.

Optionally, the seal is an elastically deformable component and extends around the mating end of the inner shell.

Optionally, the seal is adhered to the portion.

Some embodiments relate to an electrical connector. The electrical connector may include an outer shell including a mating end; an inner shell disposed in the outer shell and including a mating end extending beyond the mating end of the outer shell; a lead assembly disposed in the inner shell; and a seal disposed at the mating end of the inner shell and spaced from the outer shell so as to block a path from the mating end of the inner shell to the mating end of the outer shell.

Optionally, the mating end of the inner shell includes a flange portion extending around the inner shell to form a corner portion with the portion of the mating end of the inner shell that extends.

Optionally, the seal is disposed at the corner portion, and the seal includes a first surface contacting the portion of the mating end of the inner shell, a second surface contacting the flange portion of the mating end of the inner shell, and a third surface connecting the first surface and second surface.

Optionally, the seal includes a mating end surface and a bevel portion extending outwardly from the mating end surface at an angle in a range of 20 degrees to 40 degrees with respect to the mating end surface.

Optionally, the mating end of the inner shell includes a portion that has a surface roughness higher than that of portions of the inner shell; and the seal is adhered to the portion of the mating end of the inner shell.

Optionally, the portion of the mating end of the inner shell includes a pattern that is visually observable.

Optionally, the electrical connector is a USB type-C electrical connector.

Some embodiments relate to an electronic device. The electronic device may include a chassis including an opening; and an electrical connector described herein inserted into the opening of the chassis such that the seal of the electrical connector abuts the chassis.

Optionally, the seal deforms in a direction perpendicular to an insertion direction into the opening of the chassis.

Optionally, a portion of the mating end of the inner shell that contacts the seal has a surface roughness higher than portions of the inner shell.

Optionally, the portion of the mating end of the inner shell extends in the mating direction by a distance in a range of 0.5 mm to 1.5 mm.

Some embodiments relate to a method for manufacturing an electrical connector. The method may include providing a lead assembly; disposing an inner shell outside the lead assembly, wherein the inner shell includes a portion that has a surface roughness higher than that of portions of the inner shell; disposing an outer shell outside the inner shell and the lead assembly; applying an adhesive at the portion of the inner shell; and shaping and curing the adhesive to form a seal.

Some embodiments relate to an electrical connector. The electrical connector may include: a lead assembly including a tongue portion to be connected to a circuit of an electronic device by inserting the tongue portion into a port of the electronic device; a inner shell disposed on an outside of the lead assembly; and an outer shell attached to the outside of the inner shell and the lead assembly, wherein a mating end of the inner shell extends beyond a mating end of the outer shell in a mating direction in which the electrical connector is inserted into the port of the electronic device, and a rough portion is provided on the outer sidewall surface of the mating end of the inner shell that extends beyond the mating end of the outer shell, and wherein the electrical connector further includes a seal, which is attached to the rough portion of the inner shell.

Optionally, the surface roughness of the rough portion of the inner shell may be obtained with Electrical Discharge Machining (EDM) in a range of 8 to 12.

Optionally, the rough portion may include a pattern formed by at least one of a twill pattern, a grid pattern, and a predetermined symbol pattern.

Optionally, the twill pattern may be a pattern with stripes in opposite directions.

Optionally, the twill pattern may be zigzag pattern.

Optionally, the predetermined symbol pattern may include at least one of a star-shaped pattern, H-shaped pattern and X-shaped pattern.

Optionally, the rough portion is provided on the outer sidewall surface of the inner shell within a width range of 0.5 mm to 1.5 mm from the mating edge of the inner shell in the mating direction.

Optionally, the seal may be an elastically deformable component, and the seal is configured to enable the seal to produce an elastic deformation in the case that the seal is inserted into the port of the electronic device and contacts with a chassis of the electronic device, so that an interference fit is produced between the seal and the chassis of the electronic device in a direction perpendicular to the mating direction.

Optionally, the seal may be configured to have an annular shape continuously extending in the circumference direction around the mating end of the inner shell, and the seal is configured to have an attachment surface which forms a positive fit with the outer sidewall surface of the mating end of the inner shell that extends beyond the mating end of the outer shell.

Optionally, the seal may have a width ranging from 0.5 mm to 1.5 mm in the mating direction.

Optionally, the mating end of the inner shell may include a flange portion continuously arranged along the circumference direction of the inner shell, the flange portion extends radially towards the outer side of the inner shell, and a corner portion is formed between a portion of the outer sidewall surface of the mating end of the inner shell that extends beyond the outer shell and the flange surface of the flange portion that continuously extends from the portion of the outer sidewall surface of the mating end of the inner shell.

Optionally, the seal may be provided at the corner portion and may be configured to have an annular shape continuously extending in the circumference direction around the mating end of the inner shell, and wherein the seal may be configured to have a first surface, a second surface and a third surface, wherein the first surface forms a positive fit with the outer sidewall surface of the mating end of the inner shell that extends beyond the mating end of the outer shell, the second surface forms a positive fit with the flange surface of the flange portion that continuously extends from the portion of the outer sidewall surface of the mating end of the inner shell, and the third surface connects the first surface and the second surface.

Optionally, a bevel portion is arranged at the mating end of the seal adjacent to the third surface in the mating direction, and the bevel portion has an inclined outer sidewall surface which can form an angle of 20 to 40 degrees with respect to a mating end surface of the seal.

Optionally, the seal may be made from adhesives.

Optionally, the electrical connector may be a USB type-C electrical connector.

Some embodiments relate to a method for manufacturing an electrical connector. The method may include: providing a lead assembly, wherein the lead assembly includes a tongue portion to be connected to a circuit of the electronic device by inserting the tongue portion into a port of an electronic device; providing an inner shell, wherein a rough portion is formed on an outer sidewall surface of the inner shell near the mating end of the inner shell; disposing the inner shell on an outside of the lead assembly, such that the inner shell covers at least a portion of the lead assembly and the tongue portion of the lead assembly is exposed from the mating end of the inner shell; providing an outer shell; attaching the outer shell on an outside of the inner shell and the lead assembly, such that the rough portion of the inner shell extends beyond the mating end of the outer shell; and applying an adhesive at the rough portion along the circumference direction of the inner shell and curing the adhesive to form a seal attached to the rough portion.

Optionally, the providing the inner shell may include: performing stamping process on the outer sidewall surface of the inner shell near the mating end of the inner shell to form a rough portion, such that the surface roughness of the rough portion of the inner shell is obtained with EDM in a range of 8 to 12.

Optionally, the providing the inner shell may include: performing embossing or knurling process on the outer sidewall surface of the inner shell near the mating end of the inner shell to form a rough portion, such that the surface roughness of the rough portion of the inner shell is obtained with EDM in a range of 8 to 12.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
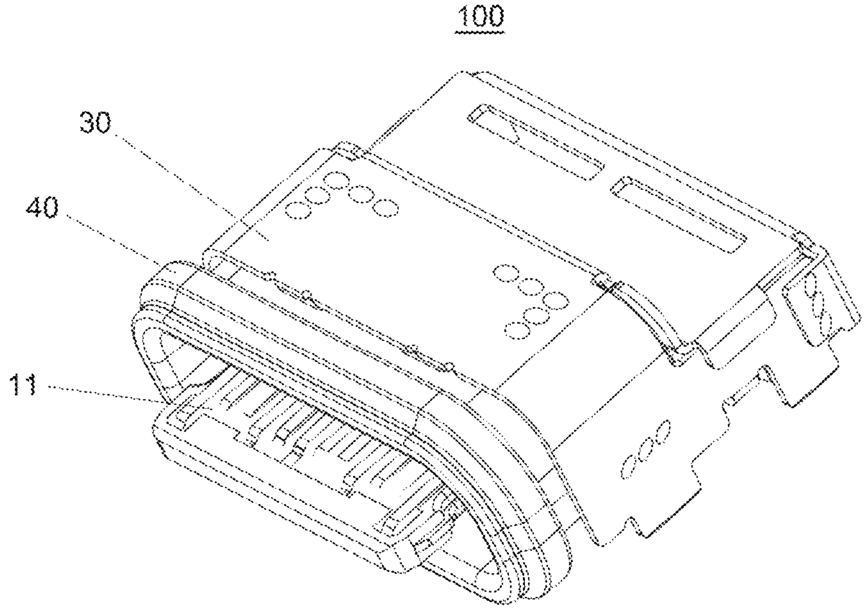
FIG. 1 shows a top perspective view of an electrical connector, according to some embodiments.
Figure 2:
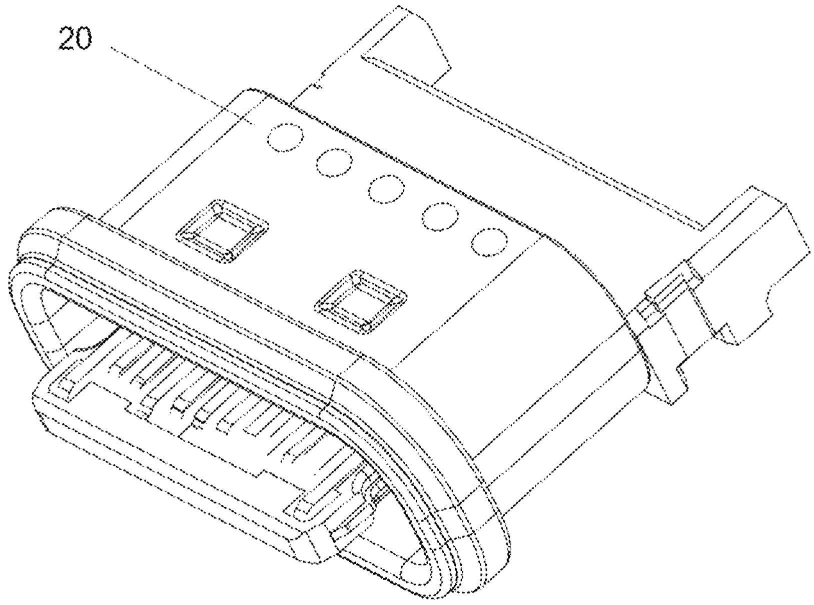
FIG. 2 shows a bottom perspective view of the electrical connector of FIG. 1, according to some embodiments.

The Inventors have recognized and appreciated connector designs that enable connectors to both have improved water resistance and be more easily manufactured. The Inventors have recognized and appreciated techniques for voiding the use of molded seals as in conventional connector designs. The Inventors have recognized and appreciated that molding is an expensive process and lacks flexibility since the molds are expensive to make and cannot be reshaped, such as to accommodate a different spacing between a location on a printed circuit board at which the connector is mounted and a wall of a chassis through which the mating interface of the connector is exposed.

In some examples, a connector may have a seal made from an adhesive, which may provide more flexibility in locating the seal. Alternatively or additionally, the seal may provide improved water resistance. Such a seal may reduce the manufacturing cost to about half that of a molded seal. In some examples, the connector may have a shell bounding a mating space in which mating ends of conductive elements are exposed for mating. The seal may be adhered to an outer surface of the shell. Such a configuration may result from forming the seal from an adhesive.

In some examples, the connector may have an outer shell, an inner shell disposed in the outer shell and with a mating end extending beyond the outer shell, and a lead assembly disposed in the inner shell. The outer shell, for example, may be used to mount to the connector to a printed circuit board. The inner shell may extend into an opening in a wall of a chassis enclosing the printed circuit board. The seal may be affixed to the inner shell independently of the shape and location of the outer shell, enabling the seal to be formed on the inner shell regardless of a desired location for mounting the connector with respect to the wall of the chassis.

One or more features may be used to provide mechanical integrity to the seal. In some examples, the mating end of the shell to which the seal is mounted may have a rough portion. That portion may be processed differently from other portions of the shell such that it has a surface roughness higher than other portions of the shell. Different processing may result from processing steps, preferentially performed on the portion, to roughen the surface. Alternatively or additionally, different processing may result from omitting processing steps that tend to smooth other parts of the shell, such as cold rolling or plating. In some examples, a desired surface roughness for the rough portion may be obtained by using Electrical Discharge Machining (EDM) in a range of 8 to 12. It should be appreciated that larger EDM may lead to higher roughness and better adhesion. In some examples, the rough portion may have patterns to enhance adhesion. These patterns may be visually observable and/or comprise symbols such as *, H, or X, which may be laser imprinted around the mating end of the shell. In some examples, the rough portion may extend in the mating direction by a distance in a range of 0.5 mm to 1.5 mm.

A seal may be disposed on the rough portion of the mating end of the inner shell such that the seal can be securely attached to the inner shell. In some examples, an adhesive (e.g., UV glue, silicone, epoxy glue, or underfill) may be disposed on the rough portion and shaped and cured on the rough portion to form the seal. The seal can be spaced from the outer shell in the mating direction so as to extend above the outer shell. Such a configuration enables the seal to deform in a direction perpendicular to the mating direction when the connector is pressed, in the mating direction, against a wall with an opening through which the mating face of the connector will be exposed, blocking ingress of environmental contaminants. The seal may also block any path between the mating ends of the inner and outer shells.

Alternatively or additionally, the shell to which the shield is affixed may have a lip forming a corner between the lip and a surface of the shell. The seal may be affixed in this corner. A surface of either or both of the lip or shell in the corner may be roughened for improved adhesion of the seal.

Referring to FIGS. 1 to 9, an electrical connector 100 may include a lead assembly 10, an inner shell 20, an outer shell 30, and a seal 40. The lead assembly 10 of the electrical connector 100 may include conductive elements for electrically connecting to a circuit (not shown) of an electronic device. The inner shell 20 and the outer shell 30 may be made from metallic materials, such as iron, aluminum and their alloys. Optionally, the inner shell 20 and the outer shell 30 may be respectively made from iron. In some embodiments, the conductive elements may be disposed in at least two rows. The lead assembly 10 may include a shielding element (not shown) between the conductive elements, which is configured to shield the signal interference between the two rows of conductive elements. Optionally, the lead assembly 10 may include a middle partition (not shown) arranged between the conductive elements to separate the two rows of conductive elements from each other.

As shown in FIGS. 1 to 9, the lead assembly 10 of the electrical connector 100 may include a tongue portion 11 to be connected to a circuit of an electronic device by inserting the tongue portion into a port 500 of the electronic device. The inner shell 20 of the electrical connector 100 may be disposed to the outside of lead assembly 10. The inner shell 20 may cover at least a portion of the lead assembly 10 and expose the tongue portion 11 of the lead assembly 10 from the mating end of the inner shell 20.

It can be understood that the term “mating end” used in the description of the present application may refer to the end of the corresponding part that is located on the forward side in the mating direction in which the electrical connector is inserted into the port of the electronic device, and the term “mounting end” refers to the end of the corresponding part that is located away from the forward side in the mating direction in which the electrical connector is inserted into the port of the electronic device. In other words, the terms “mounting end” and “mating end” may respectively indicate two opposite ends of corresponding part in the mating direction in which the electrical connector is inserted into the port of the electronic device.

Figure 3A:
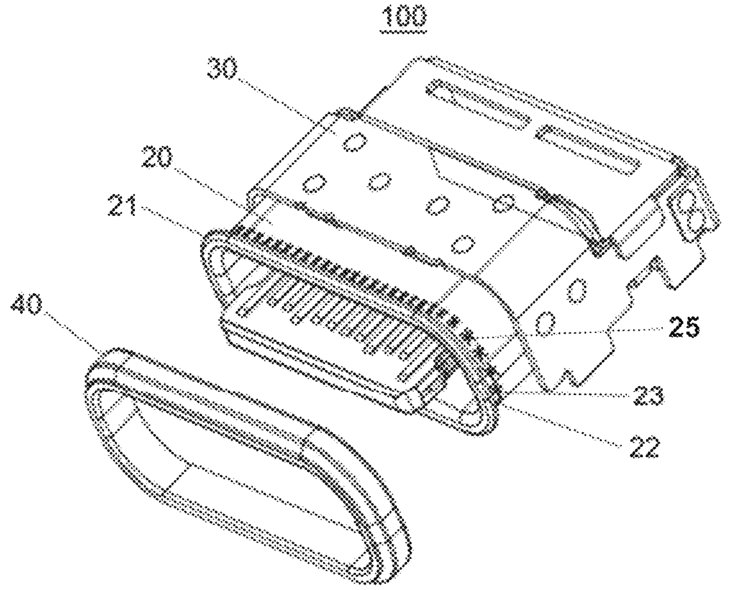
FIG. 3A shows a partially exploded perspective view of the electrical connector of FIG. 1, according to some embodiments.
Figure 3B:
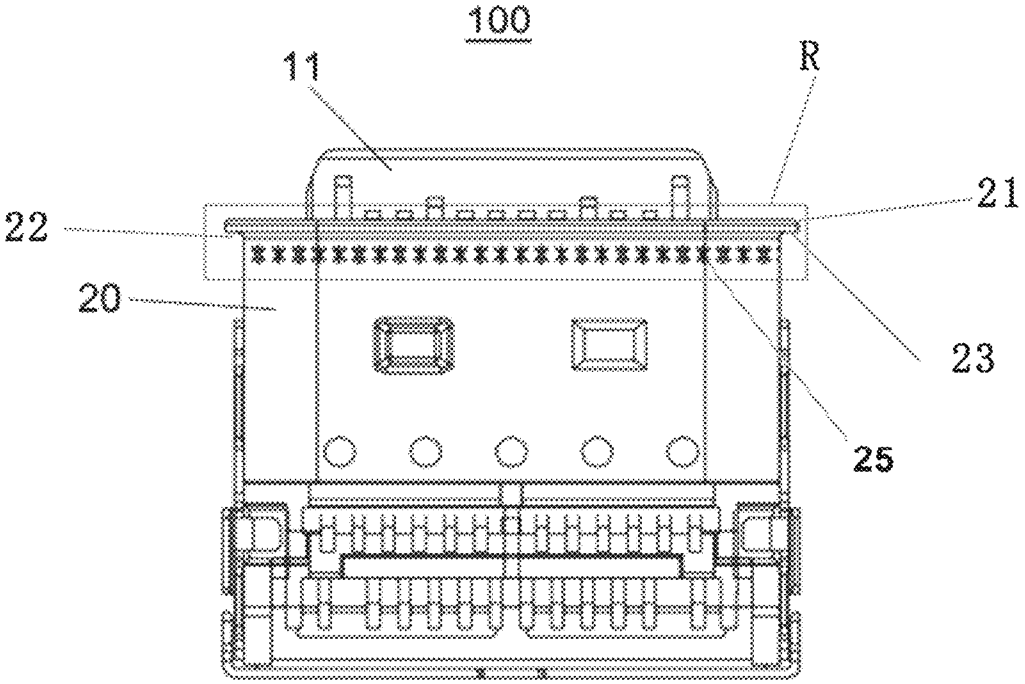
FIG. 3B shows a bottom perspective view of the electrical connector of FIG. 1, with a seal hidden, according to some embodiments.
Figure 4:
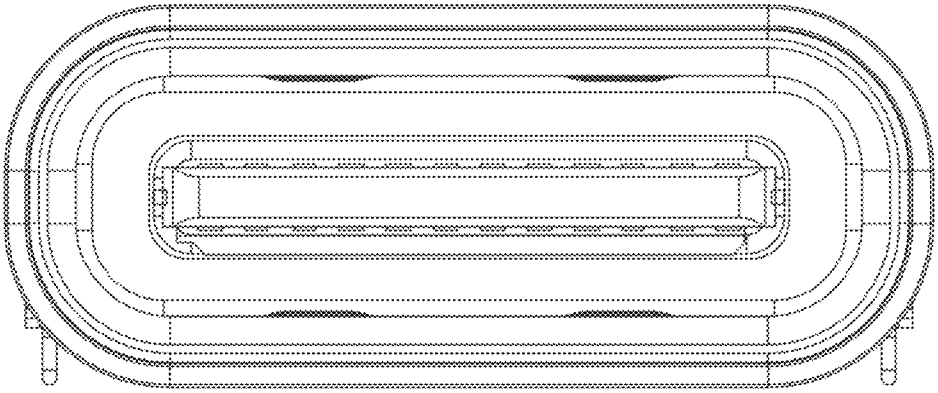
FIG. 4 shows a front view of the electrical connector of FIG. 1, according to some embodiments.
Figure 5:
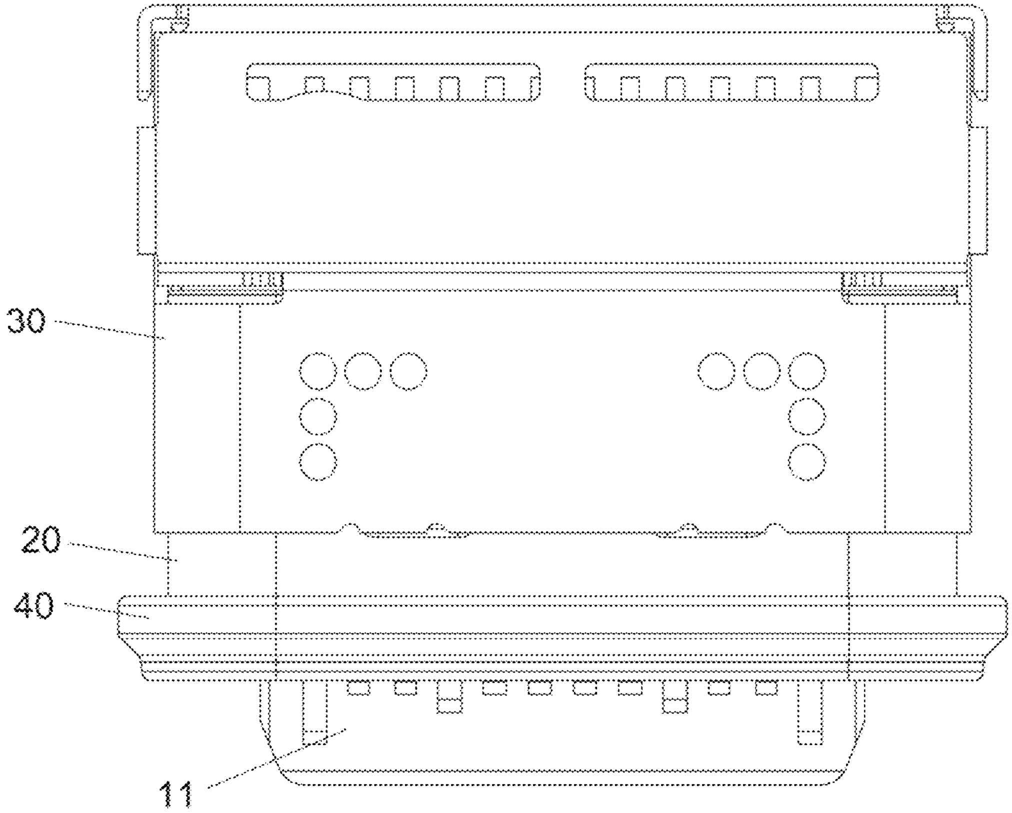
FIG. 5 shows a top view of the electrical connector of FIG. 1, according to some embodiments.
Figure 6:
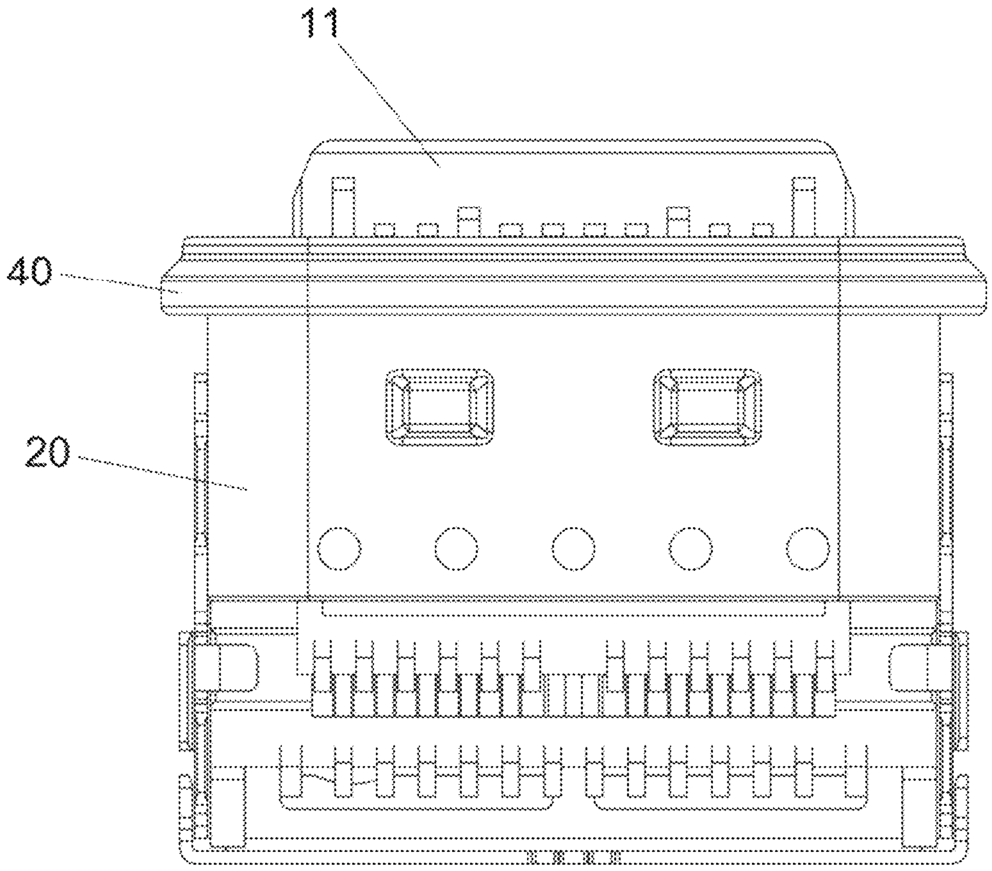
FIG. 6 shows a bottom view of the electrical connector of FIG. 1, according to some embodiments.
Figure 7:
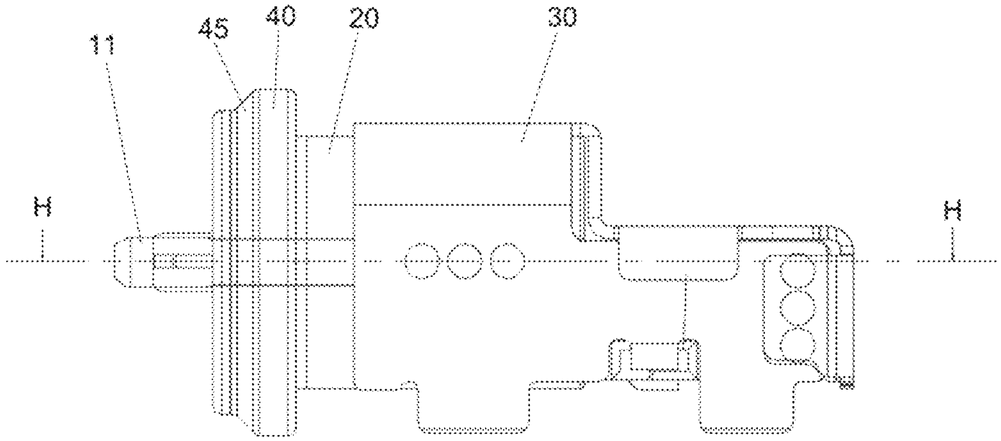
FIG. 7 shows a side view of the electrical connector of FIG. 1, according to some embodiments.
Figure 8:
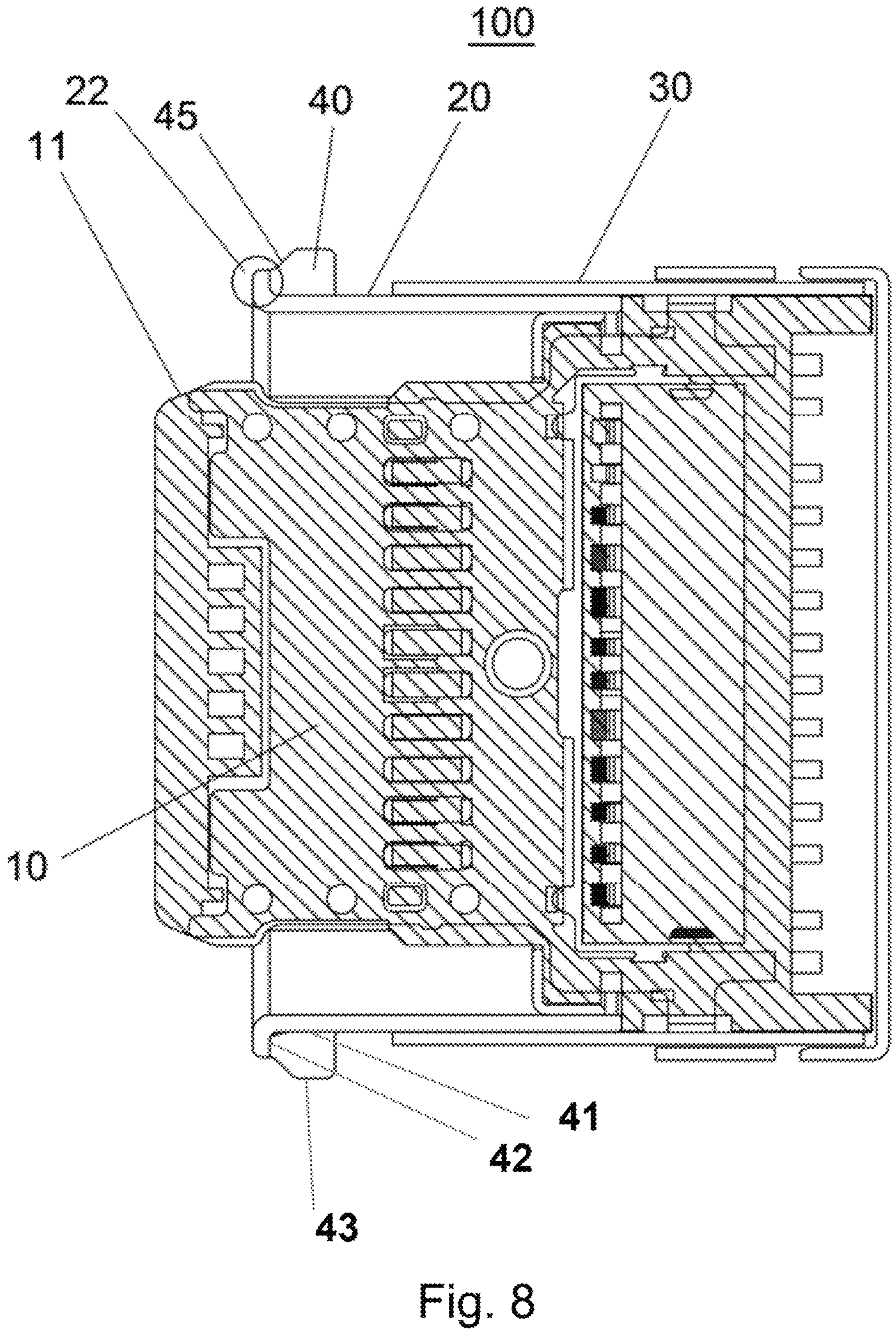
FIG. 8 shows a cross-sectional view of the electrical connector of FIG. 1 along the H-H line in FIG. 7, according to some embodiments.

In some embodiments, the outer shell 30 of the electrical connector 100 may be attached to the outside of the inner shell 20 and the lead assembly 10. The mating end of the inner shell 20 may extend beyond the mating end of the outer shell 30 in the mating direction (as shown in the first direction of FIG. 9) in which the electrical connector is inserted into the port 500 of the electronic device. As shown in FIGS. 3A and 3B, a rough portion 25 may be arranged on the outer sidewall surface of the mating end of the inner shell 20 that extends beyond the mating end of the outer shell 30. The electrical connector 100 may include a seal 40, which is attached to the rough portion 25 of the inner shell 20. In some embodiments, the seal 40 may be separated from the outer shell 30 in the mating direction, as shown in FIGS. 7 and 8.

According to aspects of the present application, a rough portion is arranged on the outer sidewall surface of the mating end of the inner shell that extends beyond the mating end of the outer shell, and a seal is arranged on the rough portion of the inner shell. With the above technical solution, the seal may provide an effective sealing between the seal and the inner shell, and the surface roughness of the rough portion may be higher than the surface roughness of the rest of the inner shell, so that the adhesion between the seal and the rough portion of the inner shell is increased. Therefore, when the electrical connector is mated with the port of the electronic device, the effectiveness of the sealing is improved between the electrical connector and the port of the electronic device to reduce the risk of environmental contaminants from entering into the interior of the electrical connector. Therefore, compared with the sealing way in the related art in which the seal implements sealing in such a manner that the seal is arranged on a complex convex structure, the seal according to the present application can be directly arranged on the rough portion of the inner shell, without arranging additional convex structure on the housings of the electrical connector, thereby achieving a more compact structure while ensuring an effective seal.

In some embodiments, the surface roughness of the rough portion of the inner shell may be obtained with Electrical Discharge Machining (EDM) in a range of 8 to 12.

According to aspects of the present application, the surface roughness of the rough portion of the inner shell may be obtained with EDM in a range of 8 to 12, such that a reaction force in an opposite direction to that of the force applied to the electrical connector during the mating/demating can be produced in the attachment area (e.g., the rough portion) where the seal is attached to the inner shell during the mating/demating. Thus, the seal is more securely attached to the inner shell of the electrical connector.

In some embodiments, the rough portion may include a pattern formed by at least one of a twill pattern, a grid pattern, and a predetermined symbol pattern. In some embodiments, the twill pattern may be a pattern with stripes in opposite directions. In some embodiments, the twill pattern may be zigzag pattern. In some embodiments, the predetermined symbol pattern may include at least one of a star-shaped pattern, H-shaped pattern and X-shaped pattern.

In some embodiments, on the outer sidewall surface of the inner shell, the rough portion may be provided within a width range of 0.5 mm to 1.5 mm from the mating edge of the inner shell in the mating direction. According to aspects of the present application, the rough portion is configured to have a pattern formed by at least one of a twill pattern, a grid pattern, and a predetermined symbol pattern, so that the desired friction is produced in the attachment area where the seal is attached to the inner shell to securely attach the seal in the attachment area, even so during the mating/demating. Accordingly, the water resistance efficiency and service life of electrical connectors are significantly improved.

Figure 9:
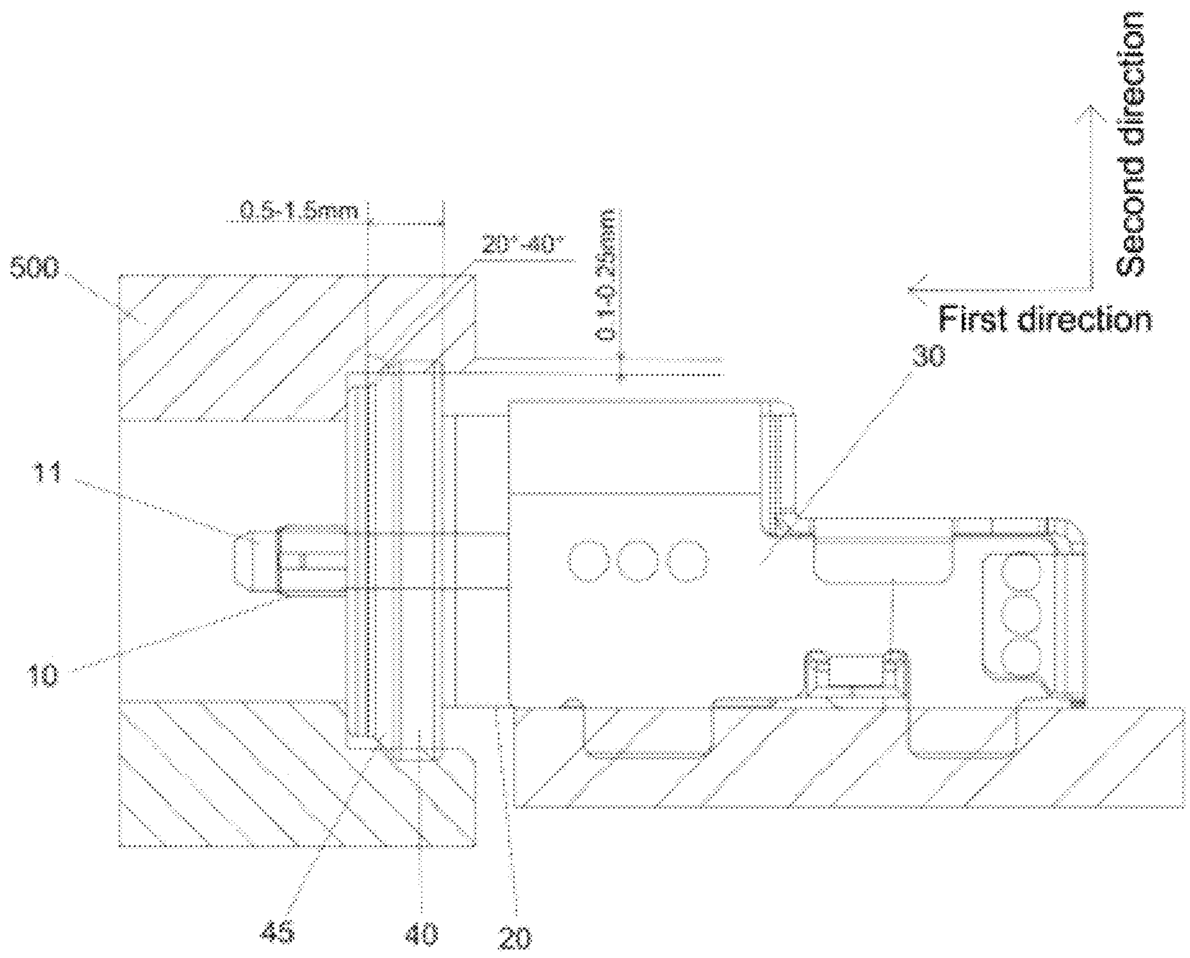
FIG. 9 shows a schematic diagram of the electrical connector of FIG. 1 mated with a port of an electronic device, according to some embodiments.

In some embodiments, the seal 40 is an elastically deformable component. As shown in FIG. 9, the seal may be configured to enable the seal 40 to produce an elastic deformation when the seal 40 is inserted into the port of the electronic device and contacts with a chassis of the electronic device, so that an interference fit is produced between the seal and the chassis of the electronic device in a direction perpendicular to the mating direction (as shown in the second direction of FIG. 9).

According to aspects of the present application, the seal is configured as an elastically deformable component, so that the seal forms an interference fit with the chassis of the electronic device in a direction perpendicular to the mating direction, so that a tight and effective sealing is produced between the electrical connector and the chassis of the electronic device. Accordingly, environmental contaminants are prevented from entering into the interior of the electrical products through the port of the electrical products, thereby improving the safety of electronic devices.

In some embodiments, the size of the outermost edge of the seal arranged on the rough portion of the inner shell in the direction perpendicular to the mating direction (as shown in the second direction in FIG. 9) is greater than the size, in the corresponding direction, of the port of the electronic device into which the electrical connector is to be inserted, so that an interference fit is produced between the seal and the port of the electronic device in the direction perpendicular to the mating direction.

In some embodiments, as shown in FIG. 9, the seal 40 may be configured to produce an elastic deformation of 0.1 mm to 0.25 mm and preferably 0.15 mm in the direction perpendicular to the mating direction (shown in the second direction in FIG. 9).

In some embodiments, the seal 40 may be configured to have an annular shape continuously extending in the circumference direction around the mating end of the inner shell and the seal 40 may be configured to have an attachment surface 41 which may form a positive fit with the outer sidewall surface of the mating end of the inner shell that extends beyond the mating end of the outer shell.

It should be understood that the term "positive fit" used in the present application may refer to a relationship between two mating parts that are shaped and positioned in such a way as to form an abutting and tight fit against each other.

In some embodiments, the seal 40 has a width ranging from 0.5 mm to 1.5 mm in the mating direction (shown in the first direction in FIG. 9). For example, the seal 40 may have a width of 0.95 mm in the mating direction in which the electrical connector is inserted into the port 500 of the electronic device. As another example, the seal 40 may have a width of 1.0 mm in the mating direction in which the electrical connector is inserted into the port 500 of the electronic device. The rough portion may be arranged on the larger area of the attachment area where the seal of the electrical connector is attached to the outer sidewall surface of the inner shell, thereby significantly increasing friction and preventing the seal from peeling off the inner shell.

In some embodiments, the mating end of the inner shell 20 may include a flange portion 21 continuously arranged along the circumference direction of the inner shell, the flange portion 21 extends radially towards the outer side of the inner shell, and a corner portion may be formed between a portion of the outer sidewall surface of the mating end of the inner shell 20 that extends beyond the outer shell 30 and the flange surface 23 of the flange portion 21 that continuously extends from the portion of the outer sidewall surface of the mating end of the inner shell, as shown in FIGS. 3A and 3B.

In some embodiments, as shown in FIG. 8, the seal 40 may be provided at the corner portion 22. The seal 40 may be configured to have an annular shape continuously extending in the circumference direction around the mating end of the inner shell, as shown in FIG. 3A. The seal 40 may be configured to have a first surface 41, a second surface 42 and a third surface 43. The first surface 41 may form a positive fit with the outer sidewall surface of the mating end of the inner shell that extends beyond the mating end of the outer shell, the second surface 42 may form a positive fit with the flange surface 23 of the flange portion that continuously extends from the portion of the outer sidewall surface of the mating end of the inner shell, and the third surface 43 may connect the first surface and the second surface, as shown in FIG. 8.

According to aspects of the present application, the corner portion may be formed on the flange surface 23 of the integrated flange portion of the inner shell of the electrical connector and the seal forms a positive fit with the corner portion, so that the sealing performance of the seal is significantly improved. With the flange surface 23 of the integrated flange portion of the inner shell being used as the supporting base for the seal, the supporting base can provide a strong support for the seal even if there is a large force on the electrical connector during the mating/demating, thereby further enhancing the sealing effect and service life of the seal. Since the seals in the present application uses the flange surface of the inner shell as the supporting base for the seal, compared with the sealing way in the related art in which the seal implements sealing in such a manner that the seal is arranged on a convex structure, the integrated flange structure design can be achieved by the technical solution of the present application, without arranging additional structures on the housings of the electrical connector. Accordingly, a more compact structural can be achieved while ensuring an effective seal.

In some embodiments, as shown in FIG. 9, a bevel portion 45 may be arranged at the mating end of the seal 40 adjacent to the third surface in the mating direction. The bevel portion may have an inclined outer sidewall surface which may form an angle of 20 to 40 degrees with respect to a mating end surface of the seal 40. In some preferred embodiments, the bevel portion has an inclined outer sidewall surface which may form an angle of 30 degrees with respect to the mating end surface of the seal 40.

According to aspects of the present application, the bevel portion 45 may be arranged at the mating end of the Seal, and the bevel portion 45 may have an inclined outer sidewall surface which may form an angle of 20 to 40 degrees with respect to the mating end surface of the seal 40 (as shown in FIG. 9), so that the portion in which the seal of the electrical connector forms interference fit with the port of the electronic device forms a taper shape. The seal with the tapered structure make it possible to reduce the peeling force exerted on the seal when the electrical connector is inserted in/pulled out, thereby ensuring that the seal of the electrical connector can be securely attached to the attachment area of the inner shell. Accordingly, the risk of the seal spelling off is further reduced and the sealing effect and service life of the electrical connector is significantly increased.

In some embodiments, the seal 40 may be made from an adhesive. For example, the seal 40 can be made from a commercially available adhesive (for example, UV glue such as Hongjin UV5192, silicone, epoxy glue, or underfill). Such an adhesive may have good adhesion to plastic, metal, glass, etc. It may have the characteristics of low odor and low irritation. The adhesive may be quickly cured to elastic adhesive film, for example, under UV irradiation. The adhesive may have the characteristics of high bonding strength, vibration resistance, high temperature resistance and good durability. The adhesive may be widely available and therefore reduce manufacturing cost. The adhesive may be environmentally friendly and pollution-free, which does not contain solvent. Therefore, the seal of the electrical connector according to the exemplary embodiment of the present application does not generate volatile organic compounds (VOC), and thus it is environmentally friendly.

According to the above technical solution of the present application, the seal of the electrical connector may be formed by curing the adhesive (e.g., with ultraviolet light). Due to the fast-curing-speed of the adhesive, the adhesive can be shaped and cured in a few seconds to tens of seconds, as a result, the seal can be rapidly manufactured, which contributes to the automatic production line, and thus improving the labor productivity.

In some embodiments, the electrical connector 100 may be a USB type-C electrical connector.

USB type-C connectors are becoming increasingly popular because of their thinner size and better performance in terms of power and data transmission. According to the technical solution of the present application, the electrical connector can be designed as a USB type-C electrical connector, such that a USB type-C type electrical connector can be obtained, which is more compact in structure and has a higher water resistance performance as well.

It is understood that other sealing structures can be arranged between the inner shell and the outer shell of the electrical connector, which are not explained in this application. The person skilled in the art can further arrange additional sealing and water resistance structures as required.

Figure 10A:
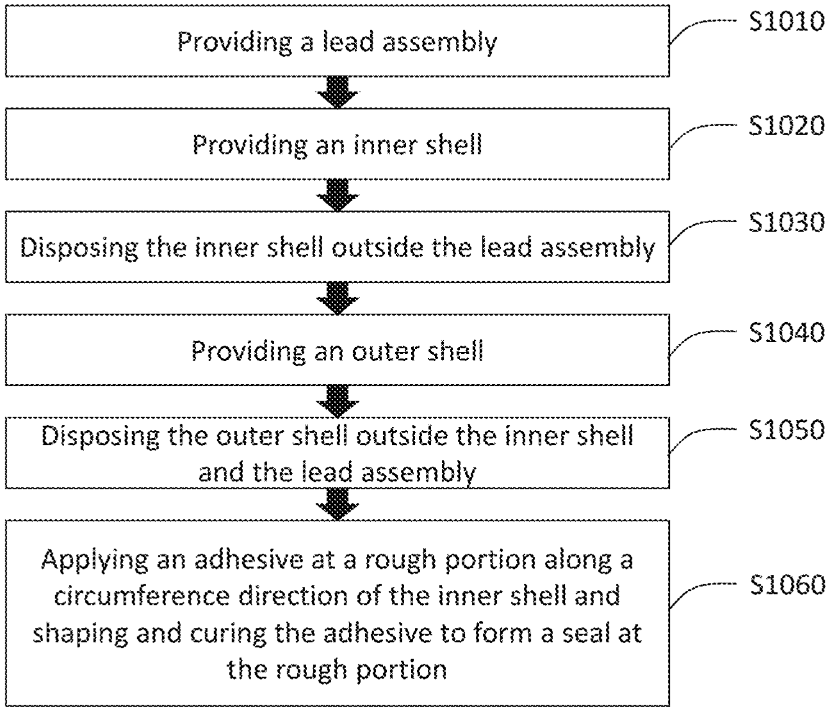
FIG. 10A shows a flowchart of a method for manufacturing an electrical connector, according to some embodiments.

In another aspect of this application, a method for manufacturing an electrical connector is provided. The method for manufacturing an electrical connector may include acts S1010 to S1060 as shown in FIG. 10A.

Specifically, in act S1010, a lead assembly 10 is provided, where the lead assembly may include a tongue portion 11 to be connected to a circuit of the electronic device by inserting the tongue portion into a port of an electronic device.

In act S1020, the inner shell 20 is provided. The inner shell may be made from iron. A rough portion may be formed on an outer sidewall surface of the inner shell near the mating end of the inner shell. In some embodiments, the rough portion of the inner shell may be obtained with EDM in a range of 8 to 12. In some embodiments, a pattern may be added to the rough portion. Optionally, the pattern may be visually observable.

In act S1030, the inner shell 20 is disposed on the outside of the lead assembly 10 such that the inner shell covers at least a portion of the lead assembly 10 and the tongue portion of the lead assembly may extend beyond the mating end of the inner shell.

In act S1040, an outer shell 30 is provided. The outer shell may be made from iron.

In act S1050, the outer shell 30 is attached to the outside of the inner shell and lead assembly such that the rough portion of the inner shell extends beyond the mating end of the outer shell.

In act S1060, an adhesive is applied at the rough portion along the circumference direction of the inner shell and the adhesive is shaped and cured to form a seal attached to the rough portion.

According to aspects of the present application, the adhesive is applied at the rough portion along the circumference direction of the inner shell and the adhesive may be shaped and cured to form a seal attached to the rough portion. With the technical solution of the present application, the seal of the electrical connector may be formed by curing the adhesive. Due to the fast-curing-speed of the adhesive, the adhesive can be shaped and cured in a few seconds to tens of seconds, as a result, the seal can be rapidly manufactured, which contributes to the automatic production line, and thus improving the labor productivity.

It should be understood that the order of the acts of the method for manufacturing the electrical connector described in the embodiment of the present application, such as acts S1010 to S1060, are only exemplary, and these acts can be performed in different order, which is not limited in the present application.

Figure 10B:
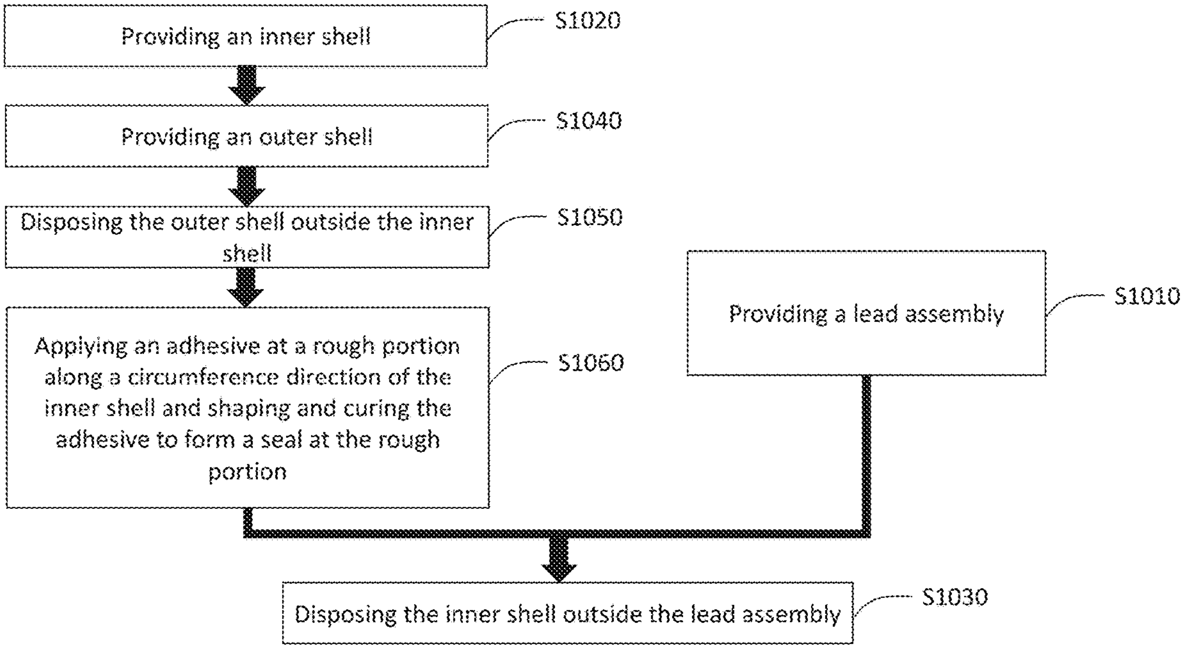
FIG. 10B shows a flowchart of a method for manufacturing an electrical connector, according to some embodiments.

In some embodiments, the act S1010 of manufacturing a lead assembly can be performed in parallel with acts S1020, S1040, S1050 and S1060, and before act S1030. As shown in FIG. 10B, the method for manufacturing the electrical connector can include: act S1010 of providing the lead assembly, the lead assembly includes a tongue portion 11 to be connected to a circuit of the electronic device by inserting the tongue portion into a port of an electronic device; and act S1020 of providing the inner shell, wherein, the inner shell may be made from iron. The rough portion is formed on an outer sidewall surface of the inner shell near the mating end of the inner shell. As described above, acts S1010 and S1020 can be performed in parallel.

Continuing with reference to FIG. 10B, the method for manufacturing the electrical connector may include act S1040 of providing the outer shell. The outer shell may be an outer iron housing made from iron.

In act S1050, the outer shell 30 is attached to the outside of the inner shell such that the rough portion of the inner shell extends beyond the mating end of the outer shell.

In act S1060, the adhesive is applied at the rough portion along the circumference direction of the inner shell and the adhesive is shaped and cured to form a seal attached to the rough portion.

Finally, in act S1030, the inner shell 20 forming with the Seal is disposed on the outside of the lead assembly 10 such that the inner shell covers at least a portion of the lead assembly 10 and the tongue portion of the lead assembly is exposed from the mating end of the inner shell.

According to aspects of the present application, the adhesive is applied at the rough portion along the circumference direction of the inner shell and the adhesive is shaped and cured to form a seal attached to the rough portion. With the above technical solution of the present application, the seal of the electrical connector is formed by curing the adhesive. Due to the fast-curing-speed of the adhesive, the adhesive can be shaped and cured in a few seconds to tens of seconds, as a result, the seal can be rapidly manufactured, which contributes to the automatic production line, and thus improving the labor productivity.

In some embodiments, the providing the inner shell 20 of act S1020 may include: performing stamping process on the outer sidewall surface of the inner shell near the mating end of the inner shell to form a rough portion, such that the surface roughness of the rough portion of the inner shell may be obtained with EDM in a range of 8 to 12.

In some embodiments, the providing the inner shell 20 of act S1020 may include: performing embossing or knurling process on the outer sidewall surface of the inner shell near the mating end of the inner shell to form patterns on the rough portion.

According to aspects of the present application, the outer sidewall surface of the inner shell of the electrical connector is processed near the mating end of the inner shell to form a rough portion, such that the surface roughness of the rough portion of the inner shell is obtained with EDM in a range of 8 to 12. Accordingly, a reaction force in an opposite direction to that of the force applied to the electrical connector during the mating/demating can be produced in the attachment area (i.e. the rough portion) where the seal is attached to the inner shell during the mating/demating. Accordingly, the seal is more securely attached to the inner shell of the electrical connector.

Having thus described several aspects of several embodiments, it is to be appreciated that various alterations, modifications, and improvements will readily occur to those skilled in the art. Such alterations, modifications, and improvements are intended to be part of this disclosure and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

As an example, although many creative aspects have been described above with reference to right angle connectors, it should be understood that the aspects of the present disclosure are not limited to these. Any one of the creative features, whether alone or combined with one or more other creative features, can also be used for other types of electrical connectors, such as vertical connectors, etc.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

In the description of the present disclosure, it is to be understood that orientation or positional relationships indicated by orientation words "front', "rear", "upper", "lower", "left", "right", "transverse direction", "vertical direction", "perpendicular", "horizontal", "top", "bottom" and the like are shown based on the accompanying drawings, for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" refer to the inside and outside relative to the contour of each component itself.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value. For example, a phrase "between about 10 and about 20" is intended to mean "between exactly 10 and exactly 20" in some embodiments, as well as "between 10±d1 and 20±d2" in some embodiments. The amount of variation d1, d2 for a value may be less than 5% of the value in some embodiments, less than 10% of the value in some embodiments, and yet less than 20% of the value in some embodiments. In embodiments where a large range of values is given, e.g., a range including two or more orders of magnitude, the amount of variation d1, d2 for a value could be as high as 50%. For example, if an operable range extends from 2 to 200, "approximately 80" may encompass values between 40 and 120 and the range may be as large as between 1 and 300. When only exact values are intended, the term "exactly" is used, e.g., "between exactly 2 and exactly 200." The term "essentially" is used to indicate that values are the same or at a target value or condition to within ±3%.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. For example, a process, method, system, product or device that contains a series of steps or units need not be limited to those steps or units that are clearly listed, instead, it may include other steps or units that are not clearly listed or are inherent to these processes, methods, products or devices. Only the transitional phrases “consisting of” and “consisting essentially of” shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

In the claims, as well as in the specification above, use of ordinal terms such as “first,” “second,” “third,” etc. does not by itself connote any priority, precedence, or order of one element over another or the temporal order in which acts of a method are performed, but are used merely as labels to distinguish one element having a certain name from another element having a same name (but for use of the ordinal term) to distinguish the elements.

What is claimed is:

1. An electrical connector comprising:
a lead assembly;
an inner shell disposed outside the lead assembly and comprising a mating end, the mating end comprising a rough portion that has a surface roughness higher than that of portions of the inner shell;
an outer shell disposed outside the inner shell and comprising a mating end offset from the mating end of the inner shell in a mating direction; and
a seal attached to the rough portion of the mating end of the inner shell.

2. The electrical connector of claim 1, wherein:
the surface roughness of the rough portion of the inner shell is obtained with Electrical Discharge Machining (EDM) in a range of 8 to 12.

3. The electrical connector of claim 1, wherein:
the rough portion of the mating end of the inner shell comprises a pattern.

4. The electrical connector of claim 3, wherein:
the pattern comprises stripes in opposite directions.

5. The electrical connector of claim 3, wherein:
the pattern comprises at least one of star-shaped symbol, H-shaped symbol, or X-shaped symbol.

6. The electrical connector of claim 1, wherein:
the rough portion of the mating end of the inner shell extends from a mating edge of the inner shell in the mating direction by a distance in a range of 0.5 mm to 1.5 mm.

7. The electrical connector of claim 1, wherein:
the seal is an elastically deformable component and extends around the mating end of the inner shell.

8. The electrical connector of claim 1, wherein:
the seal is adhered to the rough portion.

9. An electrical connector comprising:
an outer shell comprising a mating end;
an inner shell disposed in the outer shell and comprising a mating end extending beyond the mating end of the outer shell;
a lead assembly disposed in the inner shell; and
a seal disposed at the mating end of the inner shell and spaced from the outer shell so as to block a path from the mating end of the inner shell to the mating end of the outer shell, wherein:
the mating end of the inner shell comprises a flange portion; and
the seal comprises a mating end surface attached to the flange portion and a bevel portion extending outwardly from the mating end surface.

10. The electrical connector of claim 9, wherein:
the flange portion extends around the inner shell to form a corner portion with the portion of the mating end of the inner shell.

11. The electrical connector of claim 10, wherein:
the seal is disposed at the corner portion, and
the seal comprises a first surface contacting of the mating end of the inner shell, a second surface contacting the flange portion of the mating end of the inner shell, and a third surface connecting the first surface and second surface.

12. The electrical connector of claim 11, wherein:
the bevel portion extends at an angle in a range of 20 degrees to 40 degrees with respect to the mating end surface.

13. The electrical connector of claim 9, wherein:
the mating end of the inner shell comprises a portion that has a surface roughness higher than that of portions of the inner shell; and
the seal is adhered to the portion of the mating end of the inner shell.

14. The electrical connector of claim 13, wherein:
the portion of the mating end of the inner shell comprises a pattern that is visually observable.

15. The electrical connector of claim 9, wherein:
the electrical connector is a USB type-C electrical connector.

16. An electronic device comprising:
a chassis comprising an opening; and
the electrical connector of claim 9 inserted into the opening of the chassis such that the seal of the electrical connector abuts the chassis.

17. The electronic device of claim 16, wherein:
the seal deforms in a direction perpendicular to an insertion direction into the opening of the chassis.

18. The electronic device of claim 16, wherein:
a portion of the mating end of the inner shell that contacts the seal has a surface roughness higher than portions of the inner shell.

19. The electronic device of claim 18, wherein:
the portion of the mating end of the inner shell extends in a mating direction by a distance in a range of 0.5 mm to 1.5 mm.

20. A method for manufacturing an electrical connector, comprising:

providing a lead assembly;

disposing an inner shell outside the lead assembly, wherein the inner shell comprises a rough portion that has a surface roughness higher than that of portions of the inner shell;

disposing an outer shell outside the inner shell and the lead assembly;

applying an adhesive at the rough portion of the inner shell; and shaping and curing the adhesive to form a seal.

* * * * *